United States Patent [19]
Hayakawa

[11] 3,742,308
[45] June 26, 1973

[54] CURRENT CONTROL DEVICE
[75] Inventor: Shigeru Hayakawa, Osaka, Japan
[73] Assignee: Matsushita Electric Industrial Co. Ltd., Osaka, Japan
[22] Filed: Feb. 9, 1972
[21] Appl. No.: 224,800

[30] Foreign Application Priority Data
Mar. 15, 1971 Japan.............................. 46/14483
Mar. 15, 1971 Japan.............................. 46/14484

[52] U.S. Cl..................... 317/125, 317/132, 331/66
[51] Int. Cl. ........................................... H01h 47/24
[58] Field of Search...................... 331/66; 317/124, 317/125, 132, DIG. 6

[56] References Cited
UNITED STATES PATENTS
3,114,082 12/1963 Weise .................................. 317/132

Primary Examiner—James D. Trammell
Attorney—E. F. Wenderoth, John E. Lind et al.

[57] ABSTRACT

A current control device has a thermistor having an electric resistance which varies with a variation in the temperature, a heat-radiation means changable into and out of heat radiation relationship with the thermistor, and a controlling means coupled to the heat-radiation means. The control means is responsive to current flow through the thermistor for bringing the heat-radiation means into heat radiation relationship with the thermistor to control the temperature of the thermistor by negative feed-back upon variation of an electric resistance of the thermistor beyond a critical electrical resistance.

16 Claims, 7 Drawing Figures

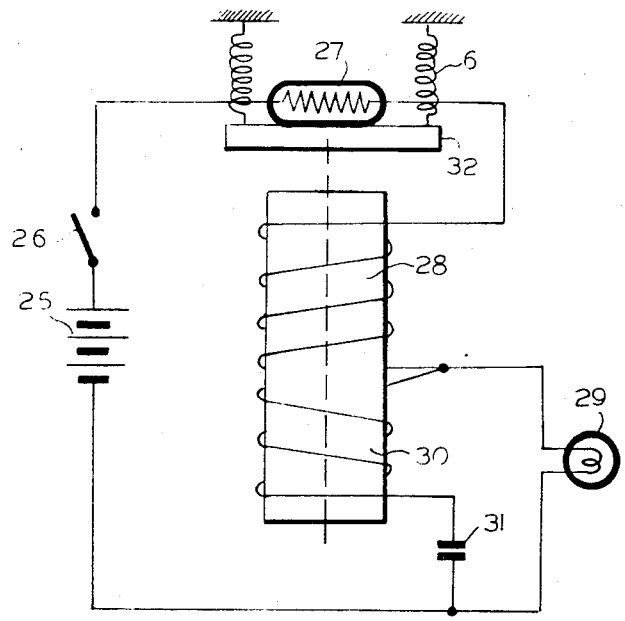
FIG.4
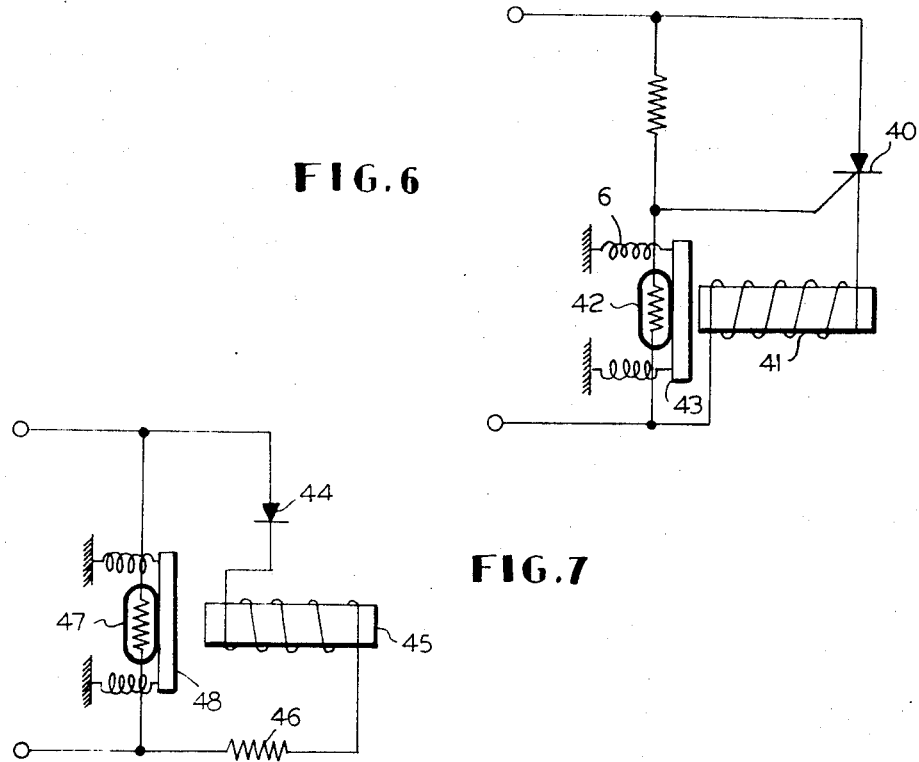
FIG.6
FIG.7

3,742,308

CURRENT CONTROL DEVICE

This invention relates to an electric current control device such as a current oscillator, an electric heating device, and a current limiting device.

In prior art current control systems, it is necessary to have a control element, such as a thermostat, having an electrical contact. However, the operation of such an electrical contact which operates due to a variation in the temperature is liable to degrade and the contact will finally cease working. Recently, current control systems having no electrical contacts have been constructed using semiconductor components such as a thyristor or a switching transistor. However, these systems are expensive because they require a complex circuit containing expensive electronic components. There have been electric current control devices using a thermistor having a positive temperature coefficient of electrical resistance, a so-called PTC thermistor. As described in, for example, U.S. Pat. No. 3,231,552, the thermistor has a specific temperature above which the electrical resistance has a positive temperature coefficient. Thus, the specific temperature can serve as a switching temperature and the thermistor can control the current flowing therethrough upon a change in the temperature from a temperature lower than the specific temperature to a temperature higher than the specific temperature, or vice-versa. However, it is difficult to make a current control system, such as current oscillator, with such a thermistor because a thermal equilibrium is established between the temperature of the thermistor and that of an object to be heated. Further, a conventional control system comprising a thermistor requires that the current to be controlled flow through the thermistor. Thus, the current to be controlled is limited to a small value because the conventional thermistor has a low thermal conductivity and does not respond quickly to a variation in the temperature of the object to be heated.

An object of the present invention is to provide a current control device having no electrical contact.

Another object of the present invention is to provide a current control device capable of causing a current to flow intermittently at a desired time interval.

A further object of the present invention is to provide a current control device responsive to a current change to a current outside a predetermined range of currents.

These objects are achieved by the provision of a current control device according to the present invention which comprises a thermistor having an electric resistance which varies with a variation in the temperature, heat-transfer means coupled thermally with said thermistor and control means for bringing said heat-transfer means into thermal contact with said thermistor to control the temperature of said thermistor in a negative feed-back way upon variation of the electric resistance of said thermistor beyond a critical electrical resistance.

For a better understanding of this invention, reference may be had to the following description taken in connection with the accompanying drawings, in which:

FIG. 4 is a circuit diagram of an on-off system for the light of a traffic warning flasher using the current control system according to the present invention.

FIG. 6 is a circuit diagram of another current oscillator using the current control system according to the present invention; and FIG. 7 is a circuit diagram of a current limitor using the current control system according to the present invention.

The thermistor used in the present invention is a resistor having an electrical resistance which increases or decreases perceptibly with an increase in the temperature. For convenience, one in which the resistance increases is called a PTC thermistor, i.e., a thermistor having a positive temperature coefficient of electrical resistance, and one in which the resistance decreases is called an NTC thermistor, i.e., a thermistor having a negative temperature coefficient of electrical resistance. A ceramic material comprising barium titanate doped with a rare earth element can be used for a PTC thermistor. A conventional thermistor comprising, for example, nickel oxide, cobalt oxide and manganese oxide can be used as an NTC thermistor.

The heat-transfer means used in the present invention is to decrease the temperature of thermistor when the temperature of the thermistor exceeds a critical temperature during the heating of the thermistor or to increase the temperature of the thermistor when it falls below the critical temperature during the cooling of the thermistor. The former action can be achieved by, for example, bringing a cold material into thermal contact with a hot thermistor. The latter action can be achieved by, for example, bringing a hot material into thermal contact with a cool thermistor. These actions also can be achieved by on and off actions of heat energy such as infra-red light. The temperature of a thermistor which is being cooled can be increased by illuminating the thermistor with infra-red light. The temperature of a thermistor which is being warmed can be decreased in the following way. The thermistor is normally warmed by both an electric current flowing therethrough and illumination by infrared light. The temperature of the thermistor which is being warmed is decreased by cutting the infrared light off.

As is clear from the above explanation, the heat-transfer means has a heat effect which is the reverse of the temperature schedule of the thermistor. That is, the temperature of the thermistor is controlled by negative feed-back by the heat-transfer means.

Figure 1:
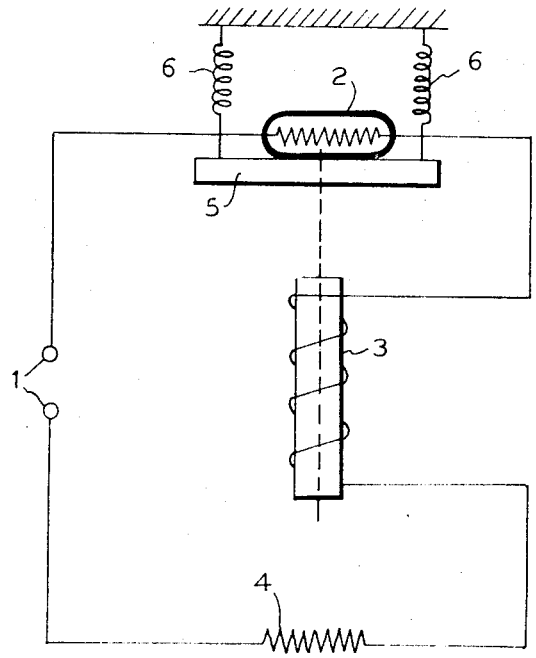
FIG. 1 is a schematic circuit diagram of the current control system of the present invention.

Referring to FIG. 1, terminals 1 are adapted to be coupled to an external current source and are connected to a series circuit comprised of a PTC thermistor 2, a solenoid 3, and a load 4. A heat transfer plate 5 is held by springs 6 in thermal contact with said PTC thermistor when an electric current flowing through said solenoid 3 is lower than a critical amount. When the current flowing through said solenoid 3 increases above said critical amount, said plate is attracted by said solenoid 3 against the force of said springs 6. The current flowing through said solenoid 3 is determined by the electrical resistance of said PTC thermistor 2.

The critical current is determined by the force of said springs 6, the weight of said heat transfer plate 5 and the design of said solenoid 3. At the moment when said terminal 1 is connected to the external current source, said heat-transfer plate 5 is in thermal contact with said thermistor 2 due to the force of said springs 6. As soon as the current increases above said critical amount, said plate 5 is attracted by said solenoid 3 against the force of said springs 6 and is separated from said PTC thermistor. The released plate 5 has no effect on the heat radiation, and thus the temperature of said thermistor 2 is caused to rise above said critical temperature. The rise of the temperature results in an increase in the electrical resistance of said PTC thermistor and the resultant decrease in the current reduces the magnetic field strength of said solenoid 3. Then, the attractive force of said solenoid 3 becomes weaker than the force of said springs 6 and said plate 5 is again driven by springs 6 into contact with said thermistor 2 and by heat absorption lowers the temperature of said PTC thermistor 2 below said critical temperature. This cycle repeats automatically and the current flowing through the circuits oscillates at a frequency which is determined by the characteristics of the thermistor, the solenoid, and the springs.

One concrete example of an electric current control device according to the present invention will be explained with reference to FIG. 1.

A solenoid 3 has a winding of 100 turns wound on an iron core 10 mm in diameter and 30 mm in length. A load 4 is a lamp of 3W operated at 6V. A PTC thermistor 2 has a size of 1 × 1 × 0.3 mm and has an electrical resistance of 11.5 ohms at room temperature. The switching temperature is 120°C. A series circuit of said lamp, said solenoid and said PTC thermistor is connected to a DC power source of 6V. A heat transfer plate 5 made of iron having a size of 10 × 10 × 5 mm is movably mounted between said solenoid and said PTC thermistor. A current flowing through said series connection oscillates between 200 mA and 500 mA at a time interval of 2 seconds in accordance with a reciprocal movement of said heat transfer plate between said solenoid and said PTC thermistor.

Figure 2:
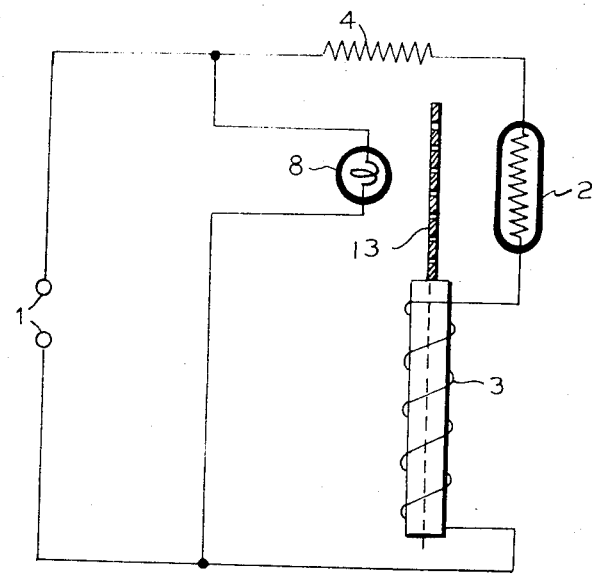
FIG. 2 is another schematic circuit diagram of the current control system of the present invention.

Referring to FIG. 2 wherein similar reference numbers designate components similar to those of FIG. 1, a series circuit of a load 4, a PTC thermistor 2 and a solenoid 3 is connected to terminals 1 coupled to an external power source. A lamp 8 for irradiation of heat energy is connected in parallel to said series circuit. A shutter 13 connected to said solenoid is positioned between said lamp 8 and the thermistor 3 when said solenoid is not fully energized. When the current flowing through said solenoid 3 is lower than a critical amount, said shutter remains in position between the lamp 8 and thermistor 2, i.e., is closed to prevent the transfer of heat energy to said PTC thermistor. When the current flowing through said solenoid 3 is higher than said critical amount, the magnetic force of said solenoid 3 moves said shutter from between said lamp 8 and said thermistor 2, i.e., the shutter is opened, and allows the transfer of said heat energy to said PTC thermistor. Such a shutter can be formed by any suitable method per se well known in the prior art.

An irradiation of heat energy due to opening of said shutter 13 makes the temperature of said PTC thermistor 2 higher, that is, the electrical resistance of said PTC thermistor 2 higher. The higher electrical resistance results in a smaller current flowing through said solenoid 3. Consequently, said shutter 13 is closed and prevents the transfer of heat energy to said PTC thermistor 2. Said PTC thermistor is cooled and has a lower electrical resistance which results in a larger current flowing through said solenoid 3. The larger current causes said shutter 13 to open. These processes are repeated automatically and said load 4 is operated intermittently.

Figure 3:
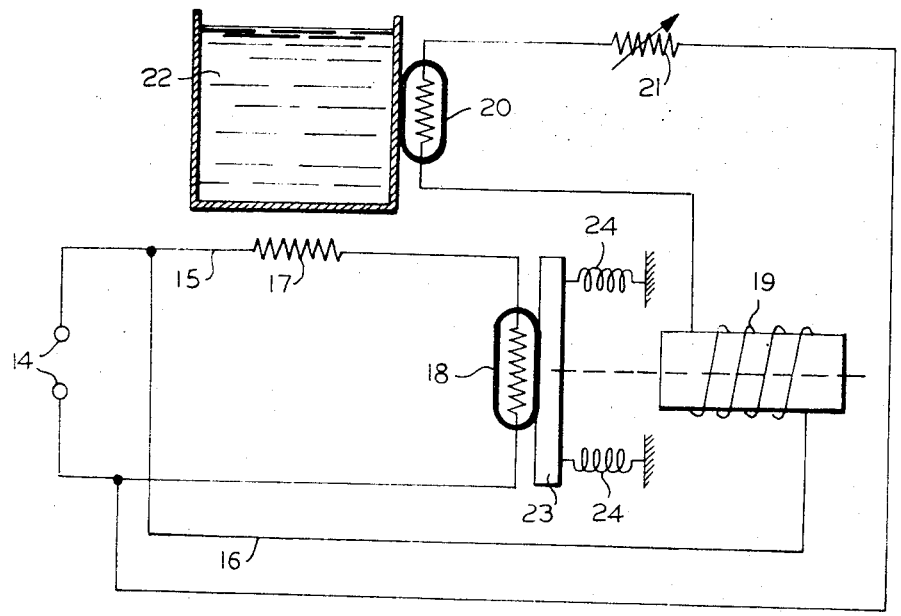
FIG. 3 is a schematic diagram of an electric heating device using the current control system according to the present invention.

Referring to FIG. 3, a heater 17 and a first PTC thermistor 18 are connected in a first series circuit 15. A solenoid 19, a second PTC thermistor 20 and a variable resistor 21 are connected in a second series circuit 16. Said thermistor 20 is in thermal contact with an object 22 to be heated by said heater 17. Said first series circuit 15 and said second series circuit 16 are connected in parallel to each other and are connected to terminals 14. A heat transfer plate 23 is movably mounted in front of said first PTC thermistor 18 on springs 24 which normally urge the plate 23 toward the solenoid 19. Said solenoid 19 produces a magnetic field when a sufficiently large current flows through said second series circuit 16 and exerts a repulsive force on said heat transfer plate 23 of said thermistor 18. When said plate 23 is in thermal contact with said thermistor 18, the current flowing through said first series circuit 15 is large enough to heat said object 22. The current flowing through said second series circuit 16 is sufficient to keep the solenoid energized so that it exerts a repulsive force on said plate 24 so as to keep it in thermal contact with said thermistor 18 against the attractive force exerted by springs 24. The amount of current is controlled by said thermistor 20 in thermal contact with said object 22. When the temperature of said object 22 rises above a predetermined temperature almost equal to the switching temperature of said thermistor 20, the current flowing through said second series circuit 16 decreases abruptly due to the PTC characteristic of said thermistor 20. A decrease in the current reduces the repulsive force exerted on said plate 23 and the springs 24 separate said plate 23 from said thermistor 18. The separation substantially stops the transfer of heat from the thermistor 18 and the temperature of said thermistor 18 increases so that the current flowing through said first series circuit 15 decreases abruptly. Consequently, said heater 17 stops heating said object 22. On the other hand, when the temperature of said object 22 drops below the switching temperature of said thermistor 20, the current flowing through said second series circuit 16 increases and the repulsive force produced by said solenoid 19 moves said plate 23 into thermal contact with said thermistor 18. Then, the temperature of said thermistor 18 decreases below the switching temperature and the current flowing through said first series circuit 15 increases. Finally, the heater 17 begins to heat said object 22. This cycle keeps the temperature of said object 22 in a predetermined temperature range depending on the switching temperature of said thermistor 20 and the value of the variable resistance 21.

Referring to FIG. 4, a current source 25 is connected through a switch 26 to a series circuit of a PTC thermistor 27, a solenoid 28 and a lamp 29. Another solenoid 30 which is coaxial with said solenoid 28 is connected, at one end, to said solenoid 28 and at the other end to a capacitor 31 which is connected to a junction point between said lamp 29 and said current source 25. A heat transfer plate 32 is movably mounted between said PTC thermistor 27 and said solenoid 28 on springs 6 which normally urge said plate 32 into contact with the thermistor 27. aid solenoid 28 has a winding which is wound in the opposite direction from that of said solenoid 30. When said switch 26 is closed, the plate 32 is kept in thermal contact with said thermistor 27 during the charging period of said capacitor 31, because the attractive force produced by solenoid 28 is cancelled by repulsive force produced by solenoid 30. When the charging is finished, current no longer flows through said solenoid 30, but continues to flow through said thermistor 27, said solenoid 28, and said lamp 29. At this time, the attractive force produced by said solenoid 28 separates said plate 32 from said thermistor 27. A temperature rise of said thermistor results in an increase of the electrical resistance due to the PTC characteristics and the current falls. Thereupon a current due to discharge of said capacitor 31 flows through said solenoid 30 and said lamp 29. Then, the repulsive force produced by said solenoid 30 permits the springs 6 to pull said plate 32 back against said thermistor 27. Thermal contact of said plate 32 with said thermistor 27 results in a decrease in the temperature of said thermistor and the current flows to charge said capacitor 31. This cycle produces an oscillation of current flowing through said lamp 29. The frequency of oscillation is determined essentially by the period of charging and discharging of said capacitor 31. The oscillation of current turns said lamp 29 on and off at a time interval of said frequency.

Figure 5:
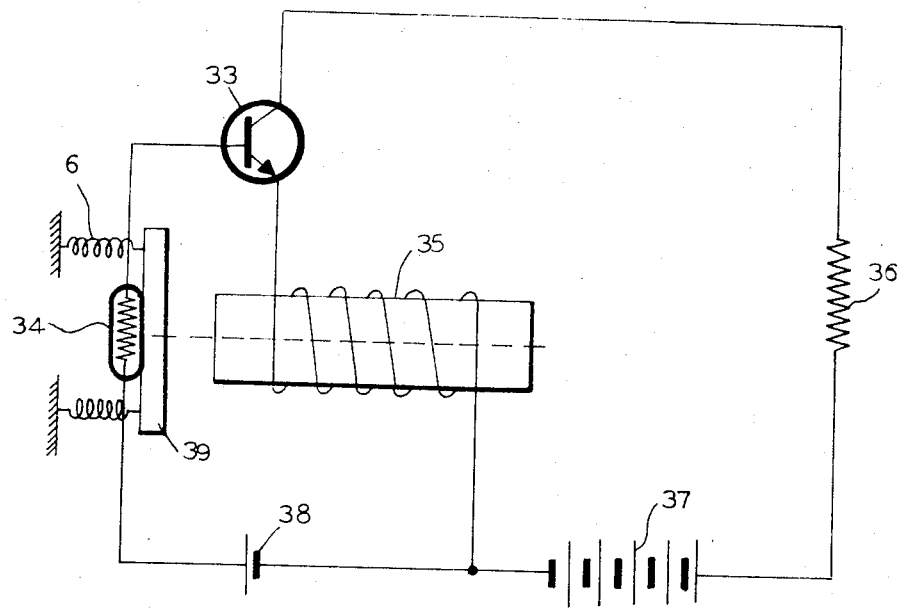
FIG. 5 is a current diagram of a current oscillator using the current control system according to the present invention.

FIG. 5 is a common emitter circuit of an npn transistor 33 in which a PTC thermistor 34 is inserted in the base circuit, a solenoid 35 in the emitter circuit, and a load 36 in the collector circuit, respectively. Current sources 37 and 38 are inserted in the collector and base circuits, respectively. A heat transfer plate 39 movably mounted on springs 6 is located between said thermistor 34 and said solenoid 35. The attractive force produced by said solenoid 35 moves said heat transfer plate 39 away from said thermistor 34 against the force of springs 6. A relatively large base current flows through the base circuit when said plate 39 is in contact with said thermistor 34 and causes said transistor 33 to be in the on-state. On the other hand, a relatively small base current flows when said plate 39 is out of contact with said thermistor 34 and causes said transistor 33 to be in the off-state. The on-state of said transistor 34 is characterized by a large current flow through the emitter circuit which actuates the solenoid 35, and off-state of said transistor is characterized by diminution of the current which deactivates the solenoid. Said load 36 is operated intermittently at a desired interval which is determined by the circuit design.

Referring to FIG. 6, a solenoid 41 and an NTC thermistor 42 are inserted into the main circuit and the gate circuit of a thyristor 40, respectively. The gate voltage to produce the on-state of said thyristor 42 is determined by the resistance of said thermistor 42 in contact with the heat-transfer plate 43 which is movably mounted on springs 6 between said thermistor and said solenoid 41. The gate voltage obtained when said plate 43 is separated from said thermistor 42 switches said thyristor 40 to the off-state. An attractive force is produced by a current flowing through said solenoid 42 in the on-state of said thyristor 40 and separates said plate 43 from said thermistor 42 against the action of springs 6. In the off-state of said thyristor 40, the attractive force is too small to separate the plate 43 from the thermistor 42 and said plate 43 remains in contact with said thermistor 42. Thus current oscillation is produced in the main circuit of FIG. 6.

Referring to FIG. 7, a Zener diode 44, a solenoid 45 and a load 46 are connected in series. An NTC thermistor 47 is connected in parallel to said series connected diode, solenoid and load. A heat-transfer plate 48 is movably mounted on springs 6 between said NTC thermistor 47 and said solenoid 45 and is separated from said NTC thermistor by the attractive force of said solenoid 45 produced by a current of a predetermined value. Therefore, when the current flowing through said diode 44 and said solenoid 45 rises to the predetermined value, the attractive force of said solenoid 45 separates the said plate 48 from said thermistor 47. Thus, the resistance of said thermistor 47 decreases due to the NTC characteristic and the current is divided between said diode 44 and said thermistor 47. Consequently, the current flowing through said diode 44 is controlled by the above-mentioned action.

What is claimed is:

1. A current control device comprising a thermistor having an electric resistance which varies with a variation in the temperature, a heat-transfer means changable into and out of heat transfer relationship with said thermistor, and a controlling means including a solenoid coupled to said heat-transfer means and responsive to current flow through said thermistor for bringing said heat-transfer means into heat transfer relationship with said thermistor to control the temperature of said thermistor by negative feed-back upon variation of an electric resistance of said thermistor beyond a critical electrical resistance.

2. A current control device as claimed in claim 1 wherein said heat-transfer means comprises a magnetic plate, holding means movably supporting said plate for movement into and out of thermal contact with said thermistor, and said controlling means comprises said solenoid electrically connected in series relationship with said thermistor.

3. A current control device as claimed in claim 1 wherein said heat-transfer means comprises a light source illuminating said thermistor and a shutter movable into and out of a position between said light source and said thermistor and coupled to said solenoid to be operated thereby.

4. A current control device as claimed in claim 1 wherein said heat transfer means comprises a plate of magnetic material and holding means resiliently movably supporting said plate for movement into and out of thermal contact with said thermistor and biased for movement toward said thermistor, and said solenoid being positioned for exerting a magnetic attractive force on said plate when said solenoid is energized, said solenoid being electrically coupled with said thermistor.

5. A current control device as claimed in claim 4 wherein said solenoid is in series relationship with said thermistor.

6. A current control device as claimed in claim 5 wherein said controlling means further comprises a parallel circuit having a lamp in one branch and a solenoid winding and a capacitor in series in the other branch, said solenoid winding being wound on said solenoid in a direction to reduce the magnetic attractive force of said solenoid on said plate, said parallel circuit being connected in series with said solenoid and said thermistor, whereby said lamp is caused to flash periodically.

7. A current control device as claimed in claim 4 wherein said solenoid is electrically coupled in parallel with said thermistor.

8. A current control device as claimed in claim 1 wherein said thermistor has a resistance heater in series therewith, and said controlling means further comprises a further thermistor connected in series with said solenoid and thermally associated with a substance to be heated by said resistance heater, whereby the resistance heater is controlled for periodically heating the substance to be heated.

9. A current control device as claimed in claim 7 wherein said controlling means further comprises an npn transistor having the base connected to the thermistor and having the emitter connected to the solenoid, whereby a load connected across the collector of the transistor and the parallel circuit of the thermistor and the solenoid can be operated intermittently.

10. A current control device as claimed in claim 7 wherein said controlling means further includes a Zener diode connected in series with said solenoid.

11. A current control device as claimed in claim 7 wherein said controlling means further includes a thyristor connected in series with said solenoid, the gate circuit of said thyristor being connected to said thermistor.

12. A current control device comprising a series connection of a thermistor and a solenoid winding wound on a solenoid; and a magnetic plate held by a holding means which resiliently movably supports said magnetic plate for movement into and out of thermal contact with said thermistor, said solenoid being electrically coupled with said thermistor and positioned for exerting a magnetic attractive force on said magnetic plate when said solenoid is energized.

13. A current control device as claimed in claim 12 wherein said thermistor has a positive temperature coefficient of resistance.

14. A current control device as claimed in claim 12 wherein said thermistor has a negative temperature coefficient of resistance.

15. A current control device as claimed in claim 12 which further comprises a lamp connected in series with said series connection; and a further series connection of a further solenoid winding and a capacitor, said further series connection being connected in parallel with said lamp, said further solenoid winding being wound on said solenoid in a direction to reduce the magnetic attractive force of said solenoid on said magnetic plate, whereby said lamp is caused to flash periodically.

16. A current control device as claimed in claim 12, which further comprises an npn transistor having the base connected to the thermistor and having the emitter connected to said solenoid winding, whereby said solenoid and a load connected across the collector can be operated intermittently.

* * * * *